(12) United States Patent
Nguyen et al.

(10) Patent No.: US 6,646,059 B2
(45) Date of Patent: Nov. 11, 2003

(54) PROCESS FOR REMOVING IRON-AND RHODIUM-CONTAINING CATALYST RESIDUES FROM HYDROGENATED NITRILE RUBBER

(75) Inventors: Paul Nguyen, London (CA); Harald Bender, Pulheim (DE); Gilles Arsenault, Sarnia (CA); Ignazio Spadola, Sarnia (CA); Franz-Josef Mersmann, Bergisch Gladbach (DE)

(73) Assignee: Bayer Inc., Sarnia (CA)

( * ) Notice: Subject to any disclaimer, the term of this patent is extended or adjusted under 35 U.S.C. 154(b) by 0 days.

(21) Appl. No.: 10/000,520

(22) Filed: Nov. 2, 2001

(65) Prior Publication Data

US 2002/0120071 A1 Aug. 29, 2002

(30) Foreign Application Priority Data

Nov. 6, 2000 (CA) .............................. 2325240

(51) Int. Cl.⁷ .................................. C08F 8/04
(52) U.S. Cl. ................ 525/338; 525/332.8; 525/332.9; 525/333.1; 525/333.2; 525/339; 525/351; 525/352
(58) Field of Search ................ 525/338, 339, 525/351, 352

(56) References Cited

U.S. PATENT DOCUMENTS

| 4,382,124 A | 5/1983 | Meitzner et al. ............... 521/38 |
| 4,396,761 A | 8/1983 | Willis et al. ................. 528/487 |
| 4,419,245 A | 12/1983 | Barrett et al. ................ 210/681 |
| 4,427,794 A | 1/1984 | Lange et al. ................... 521/28 |
| 4,444,961 A | 4/1984 | Timm .......................... 526/88 |
| 4,464,515 A | 8/1984 | Rempel et al. ............. 525/338 |
| 4,510,293 A | 4/1985 | Kubo et al. ................. 525/338 |
| 4,595,749 A | 6/1986 | Hoxmeier .................... 528/483 |
| 4,985,540 A | 1/1991 | Bradford et al. ............. 528/482 |
| 5,231,115 A | 7/1993 | Harris ......................... 521/28 |

FOREIGN PATENT DOCUMENTS

| CA | 2316676 | 2/2001 |
| EP | 0 467 429 | 1/1992 |
| EP | 1 000 660 | 5/2000 |
| GB | 1558491 | 1/1980 |

OTHER PUBLICATIONS

CA 87:26590, Recovery of noble metals from waste catalyst.

CA 95:10502, Recovery of high purtiy platinum and rhodium from platinum–rhodium alloy wastes.

*Primary Examiner*—Bernard Lipman
(74) *Attorney, Agent, or Firm*—Joseph C. Gil; Noland J. Cheung; Jennifer R. Seng

(57) ABSTRACT

A process is provided for the removal of iron- and rhodium-containing residues from a solution of hydrogenated nitrile rubber. The process utilizes an ion-exchange resin having thiourea functional groups. Further, the resin is both macroporour and monodispersed. The process removes both rhodium and iron from viscous rubber solutions. In a preferred embodiment, the process is carried out in an ion-exchange column.

11 Claims, 2 Drawing Sheets

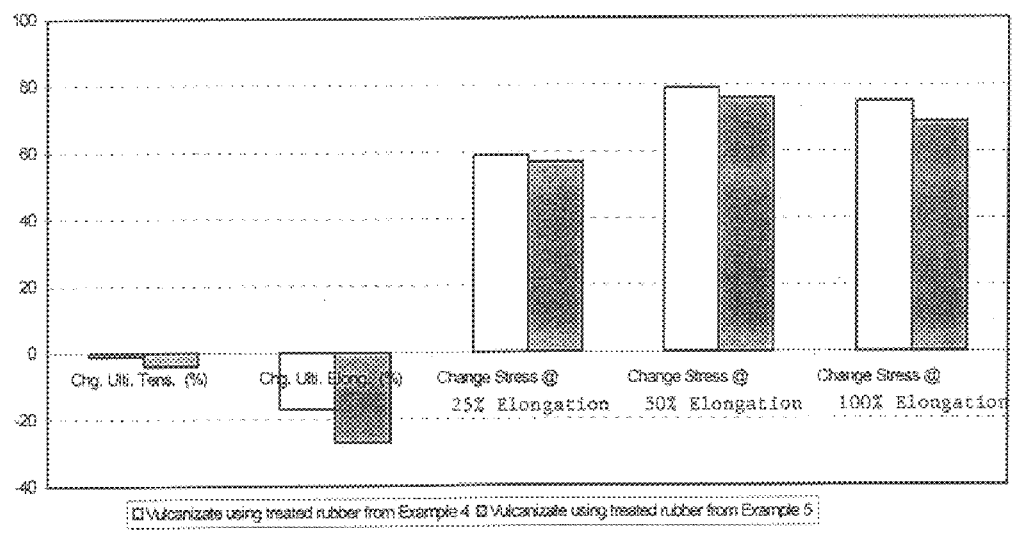
Figure 1: After hot air aging at 150°C for 168 hours

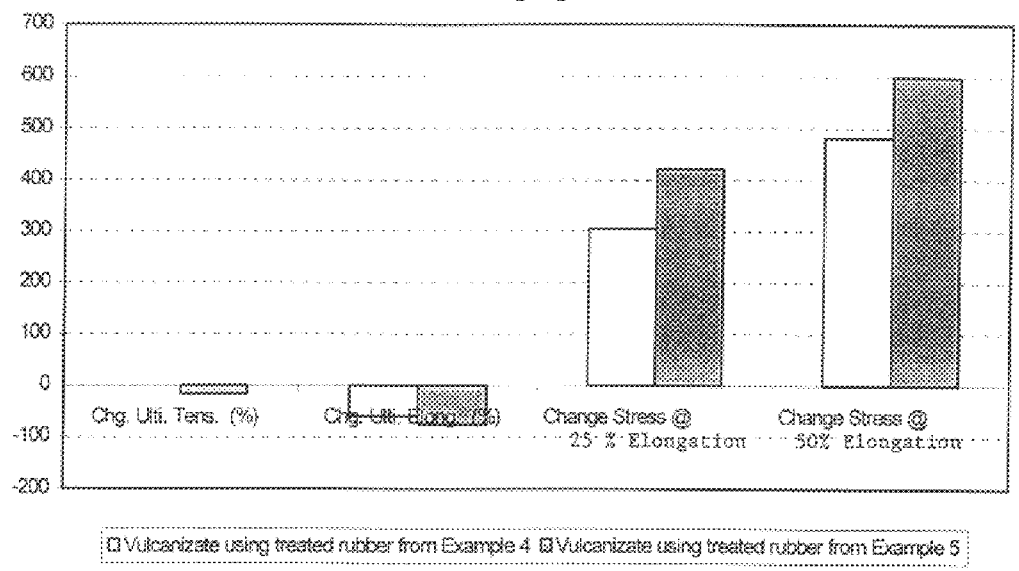

US 6,646,059 B2

PROCESS FOR REMOVING IRON- AND RHODIUM-CONTAINING CATALYST RESIDUES FROM HYDROGENATED NITRILE RUBBER

FIELD OF THE INVENTION

This invention provides a process for the removal of iron- and rhodium-containing catalyst residues from hydrogenated nitrile rubber.

BACKGROUND OF THE INVENTION

Polymer hydrogenation, and the subsequent separation of the hydrogenation catalyst from the polymer, are both well known unit operations, as disclosed, for example, in U.S. Pat. Nos. 4,396,761; 4,510,293 and 4,595,749.

More specifically, certain rhodium-containing catalysts are known to be particularly suitable for the selective hydrogenation of nitrile rubber (i.e. reduction of the carbon—carbon double bonds without concomitant reduction of the carbon-nitrogen triple bonds present in nitrile rubber). Such hydrogenated nitrile rubber is less susceptible to heat-induced degradation in comparison to unsaturated nitrile rubber.

For example, UK Patent 1,558,491 teaches the use of chlororhodium-(tristriphenylphosphine), [i.e. $RhCl(PPh_3)_3$] in such a process. Similarly, U.S. Pat. No. 4,464,515 teaches the use of hydridorhodium-tetrakis(triphenylphosphine) catalyst [i.e. $HRh(PPh_3)_4$] for the same purpose. In both of these processes the unsaturated nitrile rubber is first dissolved in a suitable solvent to provide a viscous rubber solution. The catalyst is then dissolved in the rubber solution. These hydrogenation processes are said to be homogeneous because the substrate and catalyst are contained in the same phase.

An advantage of the above homogeneous processes is that they require minimal amounts of catalyst to effect the hydrogenation. However, a major disadvantage of such processes is that it is difficult to remove the catalyst from the reaction mixture once the reaction is complete (by comparison, in a heterogeneous process (i.e. where the catalyst is not dissolved in the reaction medium) the catalyst may be readily removed by filtration or centrifugation).

Besides rhodium, iron residue may also be present in the nitrile polymer. Both iron and rhodium are active catalytic metals and, therefore, it is desirable to remove them from the hydrogenated rubber in order to improve the overall quality of the product. Furthermore, the high price of rhodium provides an economic incentive for its recovery. The prior art directed towards the recovery of rhodium from hydrogenated rubber is disclosed in U.S. Pat. No. 4,985,540, which describes a process in which a solution containing hydrogenated nitrile rubber in a hydrocarbon solvent is treated with an ion-exchange resin. The ion-exchange resin utilized was characterized as being a heterodispersed macroporous resin having a functional group selected from a primary amine, a secondary amine, a thiol, a carbodithioate, a thiourea, and a dithiocarbamate.

The recovery of rhodium complexes from non-viscous chemical process streams using ion-exchange resins is also known. For example, Chemical Abstracts (CA) 75: 19878e (1971) describes the separation of rhodium-containing catalysts from oxo reaction streams using an ion-exchange resin. CA 85: 588k (1976) teaches the use of a thiol-functionalized resin to recover Group VII metals from spent organic solutions which contain catalysts. CA 87: 26590p (1977) describes a two-stage process in which (I) an aqueous, noble-metal containing solution is prepared by extracting metal from a catalyst carrier and (ii) the noble metal is adsorbed by an ion-exchange resin. Finally, CA 95: 10502r (1981) relates to the recovery of platinum and rhodium by extracting the metals from spent catalysts using HCl and $HNO_3$, followed by the subsequent use of an ion-exchange column to separate the metals.

Notwithstanding the above methods of the art, there remains room for improvement in methods for removing iron- and rhodium-containing catalyst residues from hydrogenated nitrile rubber, particularly with respect to viscous solutions of hydrogenated nitrile rubber.

SUMMARY OF THE INVENTION

An improved process for the removal of iron- and rhodium-containing catalyst residues from hydrogenated nitrile rubber is provided, the process comprising the treatment of a solution of hydrogenated nitrile rubber containing such residues with an ion-exchange resin, the resin being a homodispersed macroporous cross-linked styrene-divinylbenzene copolymer resin having thiourea functional groups.

The aforementioned ion-exchange resin is capable of removing both iron and rhodium residues from the hydrogenated nitrile rubber.

In a further aspect of the invention there is provided a column process for the removal of iron- and rhodium-containing catalyst residues from hydrogenated nitrile rubber which results in a markedly lower pressure drop across the system, thus increasing production capacity by allowing higher volume throughput.

BRIEF DESCRIPTION OF THE DRAWINGS

FIGS. 1 and 2 show the resulta of effects of residual metals upon hot air aging of the treated rubber samples from Examples 3 and 4 being compounded.

DETAILED DESCRIPTION

As used herein, the term "hydrogenated nitrile rubber" refers to the product which is obtained by the hydrogenation of at least 80 mole %, preferably from 85–99.5 mole % of the original carbon—carbon double bonds present in an unsaturated nitrile rubber. The unsaturated nitrile rubber is a copolymer of a $C_{3-5}$ α,β-unsaturated nitrile monomer and a $C_{4-6}$ conjugated diene monomer. A typical example is acrylonitrile-butadiene rubber, which is commonly referred to as NBR. Unsaturated nitrile rubber may be produced by the well-known free radical emulsion polymerization process. A typical unsaturated nitrile rubber produced by the polymerization of acrylonitrile and butadiene contains from 18–50 weight percent bound acrylonitrile units, the balance being bound butadiene.

Hydrogenated nitrile rubber is preferably prepared using a rhodium-containing catalyst, since many of the inexpensive base-metal catalysts (such as Raney nickel, cobalt alkyls and aluminum alkyls) are either not sufficiently active to catalyze the hydrogenation of nitrile rubber or are not selective (i.e. they also catalyze the reduction of carbon-nitrogen triple bonds). The use of rhodium-containing complexes as catalysts for the hydrogenation of nitrile rubber is described in UK Patent 1,558,491.

The process of the present invention requires the use of a homodispersed macroporous cross-linked styrene-divinylbenzene copolymer resin having thiourea functional groups. Such resins typically comprise crosslinked copolymers of monovinylaromatic and at least one polyvinylaromatic compounds, and are described in application DE-A 19940868, the disclosure of which is hereby incorporated by reference.

Such resins may be prepared by the following process:
(a) reacting monomer droplets made from at least one monovinylaromatic compound and at least one polyvinylaromatic compound; together, if desired, with a porogen (pore former) and with an initiator or an initiator-combination to give a monodispersed, crosslinked bead polymer,
(b) amidomethylating the monodispersed, crosslinked bead polymer from step (a) with phthalimide derivatives,
(c) converting the amidomethylated bead polymer from step (b) to an aminomethylated bead polymer, and
(d) reacting the aminomethylated bead polymer from step (c) with thiourea, with substituted thiourea, or with salts of thiocyanic acid.

The monodispersed, crosslinked vinylaromatic base polymer according to process step (a) may be prepared by processes known from the literature. Processes of this type are described, for example, in U.S. Pat. No. 4,444,961, EP-A 46,535, U.S. Pat. No. 4,419,245, or WO 93/12167.

In process step (a), at least one monovinylaromatic compound and at least one polyvinylaromatic compound are used. However, it is also possible to use mixtures of two or more monovinylaromatic compounds and mixtures of two or more polyvinylaromatic compounds.

Preferred monovinylaromatic compounds for use in process step (a) are monoethylenically unsaturated compounds such as styrene, vinyltoluene, ethylstyrene, α-methylstyrene, chlorostyrene, chloromethylstyrene, alkyl acrylates, and alkyl methacrylates. Particular preference is given to the use of styrene or mixtures of styrene with the above-mentioned monomers.

Preferred polyvinylaromatic compounds for use in process step (a) are multifunctional ethylenically unsaturated compounds such as divinylbenzene, divinyltoluene, trivinylbenzene, divinylnaphthalene, trivinyinaphthalene, 1,7-octadiene, 1,5-hexadiene, ethylene glycol dimethacrylate, trimethylolpropane trimethacrylate, or allyl methacrylate.

The amounts used of the polyvinylaromatic compounds are generally from 1 to 20% by weight (preferably from 2 to 12% by weight, particularly preferably from 4 to 10% by weight), based on the monomer or its mixture with other monomers. The nature of the polyvinylaromatic compounds (crosslinking agents) is selected with the subsequent use of the spherical polymer in mind. In many cases divinylbenzene is suitable. For most uses, commercial grades of divinylbenzene are sufficient, and comprise ethylvinylbenzene besides the divinylbenzene isomers.

In a preferred process, microencapsulated monomer droplets are used in process step (a).

Possible materials for the microencapsulation of the monomer droplets are those known for use as complex co-acervates, in particular polyesters, natural or synthetic polyamides, polyurethanes, and polyureas.

An example of a particularly suitable natural polyamide is gelatin, which is used in particular as co-acervate and complex co-acervate. For the purposes of the present invention, gelatin-containing complex co-acervates are primarily combinations of gelatin with synthetic polyelectrolytes. Suitable synthetic polyelectrolytes are copolymers incorporating units of, for example, maleic acid, acrylic acid, methacrylic acid, acrylamide, or methacrylamide. Particular preference is given to the use of acrylic acid and acrylamide. Gelatin-containing capsules may be hardened using conventional hardeners, such as formaldehyde or glutaric dialdehyde. The encapsulation of monomer droplets with gelatin, with gelatin-containing co-acervates and with gelatin-containing complex co-acervates is described in detail in EP-A 46,535. The methods for encapsulation using synthetic polymers are known. An example of a highly suitable process is interfacial condensation, in which a reactive component dissolved in the monomer droplet (for example, an isocyanate or an acid chloride) is reacted with a second reactive component (for example, an amine) dissolved in the aqueous phase.

The monomer droplets, which may be microencapsulated if desired, may, if desired, contain an initiator or mixtures of initiators to initiate the polymerization. Examples of initiators suitable for the novel process are peroxy compounds such as dibenzoyl peroxide, dilauroyl peroxide, bis(p-chlorobenzoyl) peroxide, dicyclohexyl peroxydicarbonate, t-butyl peroctoate, t-butyl peroxy-2-ethylhexanoate, 2,5-bis-(2-ethylhexanoylperoxy)-2,5-dimethylhexane, and t-amylperoxy-2-ethylhexane; and azo compounds such as 2,2'-azobis(isobutyronitrile) and 2,2'-azobis(2-methylisobutyronitrile).

The amount of initiator used is generally from 0.05 to 2.5% by weight (preferably from 0.1 to 1.5% by weight), based on the mixture of monomers.

To create a macroporous structure in the spherical polymer it is possible, if desired, to use porogens as other additives in the optionally microencapsulated monomer droplets. Suitable compounds for this purpose are organic solvents which are poor solvents and, respectively, swelling agents with respect to the polymer produced. Examples that may be mentioned are hexane, octane, isooctane, isododecane, methyl ethyl ketone, butanol, and octanol and isomers thereof.

The concepts "microporous" or "gel" and "macroporous" have been described in detail in the technical literature.

Bead polymers preferred for the purposes of the present invention and prepared in process step (a) have a macroporous structure.

Substances that are monodispersed for the purposes of the present application are those for which the diameter of at least 90% by volume or by weight of the particles varies from the most frequent diameter by not more than ±10% of the most frequent diameter.

For example, in the case of a substance with a most frequent diameter of 0.5 mm, at least 90% by volume or by weight have a size range from 0.45 mm to 0.55 mm, and in the case of a substance with a most frequent diameter of 0.7 mm, at least 90% by volume or by weight have a size range from 0.77 mm to 0.63 mm.

Monodispersed macroporous bead polymers may be produced, for example, by adding inert materials (porogens) to the monomer mixture during the polymerization. Suitable substances of this type are primarily organic substances that dissolve in the monomer but are poor solvents for the polymer (swelling agents); for example, certain aliphatic hydrocarbons.

U.S. Pat. No. 4,382,124, for example, uses alcohols having from 4 to 10 carbon atoms as porogens for preparing monodispersed, macroporous bead polymers based on styrene/divinylbenzene. An overview of preparation methods for macroporous bead polymers is also given.

The monomer droplets, which may be microencapsulated if desired, may also, if desired, comprise up to 30% by weight (based on the monomer) of crosslinked or non-crosslinked polymer. Preferred polymers derive from the above-mentioned monomers, particularly preferably from styrene.

The average particle size of the monomer droplets, which may be encapsulated if desired, is from 10 to 1000 μm, preferably from 100 to 1000 μm. The process is also very suitable for preparing monodispersed spherical polymers.

When monodispersed bead polymers are prepared according to process step (a) the aqueous phase may, if desired, comprise a dissolved polymerization inhibitor, which may be an inorganic or organic substance. Examples of inorganic inhibitors are nitrogen compounds such as hydroxylamine, hydrazine, sodium nitrite, potassium nitrite, salts of phosphorous acid such as sodium hydrogenphosphite, and sulfur-containing compounds such as sodium dithionite, sodium thiosulfate, sodium sulfite, sodium bisulfite, sodium thiocyanate, and ammonium thiocyanate. Examples of organic inhibitors are phenolic compounds such as hydroquinone, hydroquinone monomethyl ether, resorcinol, pyrocatechol, tert-butyl-pyrocatechol, pyrogallol, and condensation products made from phenols with aldehydes. Other suitable organic inhibitors are nitrogen-containing compounds, including hydroxylamine derivatives such as N,N-diethyl-hydroxylamine, N-isopropylhydroxylamine, and sulfonated or carboxylated derivatives of N-alkylhydroxylamine or of N,N-dialkylhydroxylamine, hydrazine derivatives such as N,N-hydrazino-diacetic acid, nitroso compounds such as N-nitrosophenylhydroxylamine, the ammonium salt of N-nitrosophenyl-hydroxylamine, or the aluminum salt of N-nitrosophenyl-hydroxylamine. The concentration of the inhibitor is from 5 to 1000 ppm (based on the aqueous phase), preferably from 10 to 500 ppm, particularly preferably from 10 to 250 ppm.

As mentioned above, the polymerization of the optionally microencapsulated monomer droplets to give the spherical monodispersed bead polymer may, if desired, take place in the presence of one or more protective colloids in the aqueous phase. Suitable protective colloids are natural or synthetic water-soluble polymers such as gelatin, starch, polyvinyl alcohol, polyvinylpyrrolidone, polyacrylic acid, polymethacrylic acid, or copolymers made from methacrylic acid and from methacrylates. Other suitable materials are cellulose derivatives, particularly cellulose esters and cellulose ethers such as carboxymethylcellulose, methylhydroxyethylcellulose, methylhydroxypropylcellulose, and hydroxy-ethylcellulose. Gelatin is particularly suitable. The amount of the protective colloid used is generally from 0.05 to 1% by weight (preferably from 0.05 to 0.5% by weight), based on the aqueous phase.

The polymerization to give the spherical, monodispersed, macroporous bead polymer in process step (a) may, if desired, also be carried out in the presence of a buffer system. Preference is given to buffer systems that set the pH of the aqueous phase at the beginning of the polymerization to between 14 and 6 (preferably between 12 and 8). Under these conditions protective colloids having carboxylic acid groups are present to some extent, or entirely, in the form of salts, which has a favorable effect on the action of the protective colloids. Buffer systems that are particularly suitable for the purposes of the present invention comprise phosphate salts or borate salts. For the purposes of the present invention, the terms phosphate and borate include the condensation products of the ortho forms of the corresponding acids and salts. The concentration of the phosphate or borate in the aqueous phase is from 0.5 to 500 mmol/l, preferably from 2.5 to 100 mmol/l.

The stirring speed during the polymerization is relatively non-critical and, unlike in conventional bead polymerization, has no effect on the particle size. The stirring speeds used are low speeds which are sufficient to keep the monomer droplets in suspension and to promote dissipation of the heat of polymerization. A variety of stirrer types can be used for this task. Gate stirrers with an axial action are particularly suitable.

The ratio by volume of encapsulated monomer droplets to aqueous phase is from 1:0.75 to 1:20, preferably from 1:1 to 1:6.

The polymerization temperature depends on the decomposition temperature of the initiator used and is generally from 50 to 180° C. (preferably from 55 to 130° C.). The polymerization takes from 0.5 hours to a few hours. It has proven successful to use a temperature program in which the polymerization is begun at a low temperature (for example, 60° C.) and the reaction temperature is raised as the polymerization conversion progresses. This is a very good way of fulfilling, for example, the requirement for a reaction that proceeds reliably and with a high polymerization conversion. After polymerization, the polymer is isolated using conventional methods (for example, by filtration or decanting) and washed if desired.

In process step (b) the amidomethylating reagent is first prepared. This is done, for example, by dissolving a phthalimide or a phthalimide derivative in a solvent and mixing with formalin. A bis(phthalimido) ether is then formed from this material with elimination of water. The bis(phthalimido) ether may, if desired, be reacted to give the phthalimido ester. Preferred phthalimide derivatives are phthalimide itself and substituted phthalimides such as methylphthalimide.

Solvents used in process step (b) are inert and suitable for swelling the polymer and are preferably chlorinated hydrocarbons, particularly preferably dichloroethane or methylene chloride.

In process step (b) the bead polymer is condensed with phthalimide derivatives. The catalyst used here comprises oleum, sulfuric acid, or sulfur trioxide.

The elimination of the phthalic acid residue, and with this the release of the aminomethyl group, takes place in process step (c) via treatment of the phthalimidomethylated crosslinked bead polymer with aqueous or alcoholic solutions of an alkali metal hydroxide such as sodium hydroxide or potassium hydroxide, at temperatures of from 100 to 2500C (preferably from 120 to 190° C.). The concentration of the aqueous sodium hydroxide is from 10 to 50% by weight, preferably from 20 to 40% by weight. This process allows the preparation of crosslinked bead polymers containing aminoalkyl groups with substitution of the aromatic rings at a level greater than 1.

The resultant aminomethylated bead polymer is finally washed with deionized water until free of alkali.

In process step (d) the polymers are prepared by reacting the aminomethylated monodispersed, crosslinked vinylaromatic base polymer in suspension with thiourea or with substituted thiourea or with salts of thiocyanic acid. It is particularly preferable to use thiourea or salts of thiocyanic acid.

Mineral acids are used as suspension medium, preferably aqueous hydrochloric acid at concentrations of from 10 to 40% by weight (preferably from 20 to 35% by weight).

The process preferably gives monodispersed bead polymers having the following functional groups which form during process step (d):

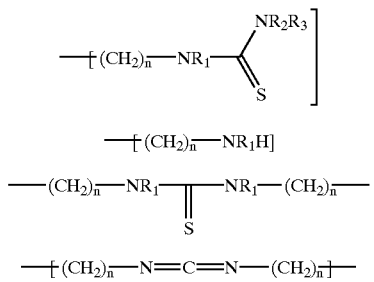

$$-\!\!-\!\!\text{\{}(CH_2)_n\!\!-\!\!NR_1H\text{]} \quad (2)$$

$$-\!\!-\!\!(CH_2)_n\!\!-\!\!NR_1\!\!-\!\!\underset{\underset{S}{\parallel}}{C}\!\!-\!\!NR_1\!\!-\!\!(CH_2)_n\!\!-\!\!- \quad (3)$$

$$-\!\!-\!\!\text{\{}(CH_2)_n\!\!-\!\!N\!\!=\!\!C\!\!=\!\!N\!\!-\!\!(CH_2)_n\text{\}}\!\!-\!\!- \quad (4)$$

wherein
$R_1$ is hydrogen or an alkyl group,
$R_2$ is hydrogen or an alkyl group,
$R_3$ is hydrogen or an alkyl group, and
n is an integer from 1 to 5 (particularly preferably 1).
In the groups $R_1$, $R_2$, and $R_3$, alkyl is preferably in each case $C_1$–$C_6$-alkyl.

In the monodispersed bead polymers having thiourea groups each aromatic ring preferably has from 0.1 to 2 of the above-mentioned functional groups (1), (2), (3), or (4).

The proportion of the individual functional groups, based on the total of all of the functional groups, is preferably:
from 30 to 80% of (1)
from 5 to 30% of (2)
from 1 to 63% of (3)
from 1 to 5% of (4).

The bead polymers are particularly suitable for removing rhodium, elements of the platinum group, gold, silver, or rhodium- or noble-metal-containing catalyst residues from organic solutions or solvents.

For example, such bead polymers can be used to remove iron- and rhodium-containing catalyst residues from the product of the hydrogenation of nitrile rubber using a homogeneous catalyst system. The rubber solution may contain from about 0.5 to about 20 weight percent rubber, preferably from about 3 to about 12 weight percent, and hence is viscous.

In a typical embodiment of the invention the resin is added to a solution of the hydrogenated nitrile rubber containing catalyst residues and the mixture stirred for a period of time sufficient for the catalyst residues to be removed by the resin. The reaction time can vary from about 5 to about 100 hours, and is preferably in the range of from about 48 to about 72 hours. The resin is removed by simple filtration and the rubber recovered by removal of the solvent using standard techniques known in the art, such as evaporation under reduced pressure.

The reaction may be carried out in an inert atmosphere, for example under a blanket of nitrogen.

Preferably, the amount of resin used in the practice of the invention ranges from about 0.1 to about 10 weight percent, based upon the amount of hydrogenated nitrile rubber in the solution. More preferably, from about 0.5 to about 5 weight percent is used.

Suitable operating temperatures range from about 60 to about 120° C. Preferably, the operating temperature is in the range of from about 90 to about 120° C. Temperatures higher than about 160° C. should not be used because of the potential for decomposition of the ion-exchange resin.

In a further embodiment of the present invention the ion-exchange resin is assembled in a bed configuration, for example by packing the resin in a column (i.e. a cylindrical container), and the nitrile rubber solution run through the column in a continuous manner.

In another embodiment of the invention the rubber solution may be passed through the column more than once, thus ensuring that as much of the catalyst residue as possible is removed by the resin.

As will be appreciated by those skilled in the art, a substantial pressure drop is caused by the flow of a solution through a bed of small particles. This phenomenon is particularly pronounced when the solution is viscous and the particles are very fine and of varying particle size. In a preferred embodiment of the present invention, however, the pressure drop resulting from the flow of the iron and rhodium-containing hydrogenated rubber solution through the ion-exchange resin bed is substantially less that that observed using a heterodispersed resin. This significant reduction in pressure drop (by a factor of about two-thirds) permits much higher volume throughput than would otherwise be possible, resulting in greatly increased production capacity of such a column process.

Further details of the invention are provided by the following non-limiting examples.

EXAMPLES

Example 1

1a) Preparation of the Monodispersed Macroporous Bead Polymer Based on Styrene, Divinylbenzene, and Ethylstyrene 3000 g of deionized water were placed in a 10 liter glass reactor, and a solution made from 10 g of gelatin, 16 g of disodium hydrogen phosphate dodecahydrate, and 0.73 g of resorcinol in 320 g of deionized water was added and thoroughly mixed. The temperature of the mixture was controlled to 25° C. Then, with stirring, a mixture made from 3200 g of microencapsulated monomer droplets with a narrow particle size distribution and made from 3.6% by weight of divinylbenzene and 0.9% by weight of ethylstyrene (used in the form of a commercially available isomer mixture of divinylbenzene and ethylstyrene in 80% of divinylbenzene), 0.5% by weight of dibenzoyl peroxide, 56.2% by weight of styrene, and 38.8% by weight of isododecane (industrial isomer mixture with a high proportion of pentamethylheptane), wherein the microcapsules were composed of a formaldehyde-hardened complex co-acervate made from gelatin and from a copolymer of acrylamide and acrylic acid, was introduced and 3200 g of aqueous phase with a pH of 12 was added. The average particle size of the monomer droplets was 460 $\mu$m.

The mix was polymerized to completion, with stirring, by increasing the temperature according to a temperature program starting at 25° C. and finishing at 95° C. The mix was cooled, washed using a 32 $\mu$m screen, and then dried in vacuo at 80° C. This gave 1893 g of a spherical polymer with an average particle size of 440 $\mu$m, narrow particle size distribution, and a smooth surface.

The polymer had a chalky white appearance from above and had a bulk density of about 370 g/l.

1b) Preparation of the Amidomethylated Bead Polymer 2373 g of dichloroethane, 705 g of phthalimide, and 505 g of 29.2% strength by weight formalin were placed in a vessel at room temperature. The pH of the suspension was adjusted to from 5.5 to 6 using aqueous sodium hydroxide. The water was then removed by distillation. 51.7 g of sulfuric acid were then metered in and the resultant water was removed by distillation. The mix was cooled. 189 g of 65% strength oleum were metered in at 30° C., followed by 371.4 g of monodispersed bead polymer prepared according to process step a) of Example 1. The suspension was heated to 70° C. and stirred for a further 6 hours at this temperature. The reaction liquid was drawn off, deionized water was metered in, and residual dichloroethane was removed by distillation.

Yield of amidomethylated bead polymer: 2140 ml
Composition by elemental analysis:
carbon: 75.3% by weight;
hydrogen: 4.9% by weight;
nitrogen: 5.8% by weight;
remainder oxygen.

1c) Preparation of the Aminomethylated Bead Polymer 1019 g of 45% strength by weight aqueous sodium hydroxide and 406 ml of deionized water were metered at room temperature into 2100 ml of amidomethylated bead polymer. The suspension was heated to 180° C. and stirred for 6 hours at this temperature.

The resultant bead polymer was washed with deionized water.

Yield of aminomethylated bead polymer: 1770 ml
The overall yield (extrapolated) was 1804 ml.
Composition by elemental analysis:
nitrogen: 11.75% by weight.

From the composition of the aminomethylated bead polymer by elemental analysis, it could be calculated that on statistical average per aromatic ring—stemming from the styrene and divinylbenzene units—1.17 hydrogen atoms had been substituted by aminomethyl groups.

1d) Preparation of the Monodispersed Resin Having Thiourea Groups 1132 ml of deionized water were placed in a 4 liter autoclave at room temperature. 1700 ml of aminomethylated bead polymer from step c), 470 g of 30% strength by weight hydrochloric acid, and 485 g of thiourea were metered into the autoclave.

The suspension was stirred for 30 minutes at room temperature. The autoclave was then heated to 145° C. over a period of 2 hours. The mixture was stirred at 145° C. for a further 15 hours.

The mix was cooled and the pressure released. The supernatant liquor was drawn off. The resultant bead polymer was washed with 4% strength by weight aqueous sodium hydroxide and finally with deionized water.

Yield: 1652 ml
Elemental analyses:

| | |
|---|---|
| Nitrogen: | 10.4% by weight |
| Sulfur: | 10.2% by weight |

Example 2

This example illustrates the use of the thiourea-functionalized macroporous resin (Lewatit OC 1601, obtained from Bayer AG (Leverkusen, Germany)) to remove iron and rhodium from an iron- and rhodium-containing solution of hydrogenated nitrile rubber in a batch process.

A 7.5% (by weight) solution in monochlorobenzene of 99% hydrogenated nitrile rubber was used as the standard for all experimental work, and the term "standard rubber solution", as used herein, refers to this solution.

In a series of 500 ml three-necked round bottom flasks, various quantities of the thiourea-functionalized monodispersed resin (namely 0.1, 0.2, 0.3, and 0.5 g) were added together with 180 g of the standard rubber solution, as indicated in Table 1. Each reaction mixture was stirred at ca. 100° C., under nitrogen, for 64 hours. The resin was then removed from the mixture by filtration and the rubber was recovered by evaporation of the solvent in a rotary evaporator, followed by drying in a reduced pressure oven at 60° C. Samples of the recovered rubber were analyzed for Rh and Fe content by atomic absorption spectroscopy and inductively coupled plasma, respectively. The results are shown in Table 1.

In a comparative experiment, the rubber from an untreated, 180 g sample of the standard rubber solution was recovered by the evaporation/drying procedures described above. The amount of Rh in this "control sample" was measured by atomic absorption spectroscopy and the amount of Fe measured by inductively coupled plasma. The amounts of Rh and Fe initially present were normalized to 100 parts, and all subsequent results are quoted with respect to the initial amounts present.

In contrast to the control sample, the Rh content of the rubber recovered after treatment was found to be in the range of 13.7–43.6 parts, depending upon the amount of resin used. These results indicate that 56–86% of the Rh was removed (i.e. in comparison to the Rh content in the standard rubber sample). The more resin sample used, the more Rh was removed from the hydrogenated nitrile rubber solution.

The Fe content of the rubber after treatment was found to be consistently in the range of 24.4–30.2 parts (with one exception where 0.2 g of resin was used). These results indicate that the resin is capable of removing a certain amount of Fe (70–76%, i.e. in comparison to the Fe content in the standard rubber sample) independent of the amount of resin used.

TABLE 1

| Sample | wt. resin (g) | initial Rh content* | % Rh removal | initial Fe content* | % Fe removal |
|---|---|---|---|---|---|
| Standard rubber | | 100 | | 100 | |
| | 0.1 | 43.6 | 56 | 24.9 | 75 |
| | 0.2 | 23.6 | 76 | 63.1 | 37 |
| | 0.3 | 19.5 | 81 | 30.2 | 70 |
| | 0.5 | 13.7 | 86 | 24.4 | 76 |

*the initial Rh and Fe content was normalized to 100

Example 3

(Comparative)

This is a comparative example in which a heterodispersed macroporous resin having dithiol functionality is used to remove Rh and Fe from a sample of the standard rubber solution in example 1. Results are shown in Table 2.

The Rh content of the rubber recovered after treatment was found to be in the range of 26.9–70.2 parts, depending upon the amount of resin used. These results indicate that 30–73% of the Rh was removed (i.e. in comparison to the Rh content in the standard rubber sample). The more resin sample used, the more Rh was removed from the hydrogenated nitrile rubber solution.

The Fe content of the rubber after treatment was found to be in the range of 40–98.2 parts depending on the amount of resin used. These results indicate that 2–60% of the Fe was removed (i.e. in comparison to the Rh content in the standard rubber sample). The more resin sample used, the more Fe was removed from the hydrogenated nitrile rubber solution.

Thus, it can be clearly seen that the use of the thiourea-functionalized monodispersed resin removed significantly more Rh and Fe from the hydrogenated nitrile rubber solution than the method of the art.

TABLE 2

| Sample | wt. Resin (g) | initial Rh content | % Rh removal | initial Fe content | % Fe removal |
|---|---|---|---|---|---|
| Standard rubber | | 100 | | 100 | |
| | 0.1 | 70.2 | 30 | 98.2 | 2 |
| | 0.2 | 40 | 60 | 77.3 | 23 |
| | 0.3 | 36.1 | 64 | 45.3 | 55 |
| | 0.5 | 26.9 | 73 | 40 | 60 |

*the initial Rh and Fe content was normalized to 100

Example 4

This example illustrates the use of the thiourea-functionalized macroporous resin to remove iron and rhodium from an iron and rhodium-containing solution of hydrogenated nitrile rubber in a column process.

The resin employed was the same thiourea-functionalized macroreticular resin used in example 1. Approximately 65–75 grams (dry weight) of the resin was packed into a column having a length of approximately 91 cm and an internal diameter of approximately 1.9 cm.

The adsorption experiment was conducted by continually passing the standard rubber solution through the packed column (once through basis) for a period of 8 hours.

The column was preheated to between 80 and 100° C. and the rubber solution was also preheated to between 50 and 70° C. One US gallon of the rubber solution was added to the column at a flow rate between 11.5 and 12.5 g/min. The effluent exiting the column was collected, dried, and the final rubber sample was analyzed for rhodium and iron. Sample of standard rubber was analyzed to determine the rhodium and iron concentration of the rubber solution prior to treatment in the column. Rhodium and iron analyses were carried out according to the procedures described in Example 1.

The Rh content of the final rubber sample after treatment was 3.08 parts, indicating that some 97% of the Rh was removed (i.e. in comparison to the Rh content in the standard rubber sample).

The Fe content of the final rubber sample after treatment was 17.2 parts, indicating that some 83% of the Fe was removed (i.e. in comparison to the Fe content in the standard rubber sample).

TABLE 3

| Sample | initial Rh content | (%) Rh removal | initial Fe content | (%) Fe removal |
|---|---|---|---|---|
| Standard rubber | 100 | — | 100 | — |
| Treated rubber | 3.08 | 97 | 17.2 | 83 |

*the initial Rh and Fe content was normalized to 100

Example 5
(Comparative)

This is a comparative example in which a heterodispersed macroporous resin having thiol functionality was used to remove Rh and Fe from a sample of the standard rubber solution in example 1 in a column process.

The adsorption experiment was conducted under the same conditions as described in Example 3. The Rh and Fe analytical results are shown in Table 4.

The Rh content of the final rubber sample after treatment was 20.1 parts, indicating that some 80% of the Rh was removed (i.e. in comparison to the Rh content in the standard rubber sample).

The Fe content of the final rubber sample after treatment was 60.3 parts, indicating that some 40% of the Fe was removed (i.e. in comparison to the Fe content in the standard rubber sample).

Again, it can be clearly seen that the use of the thiourea-functionalized monodispersed resin in a column process removed significantly more Rh and Fe from the hydrogenated nitrile rubber solution than the method of the art.

TABLE 4

| Sample | initial Rh content | (%) Rh removal | initial Fe content | (%) Fe removal |
|---|---|---|---|---|
| Standard rubber | 100 | — | 100 | — |
| Treated rubber | 20.1 | 80 | 60.3 | 40 |

*the initial Rh and Fe content was normalized to 100

Example 6
(Comparative)

The treated rubber samples from examples 4 and 5 were compounded (using a peroxide method) and the properties of the resulting vulcanizates investigated in order to determine the effects of residual metals (Rh and Fe) upon hot air aging. The results are illustrated in FIGS. 1 and 2. After aging at 150° C. for 168 hours, the vulcanizate derived from example 4 showed slightly better retention of tensile strength and elongation, but slightly worse in moduli than that of the sample derived from example 5. However, a marked difference was observed after aging at 150° C. for 672 hours, where the vulcanizate derived from example 4 showed much better retention of properties such as tensile strength, elongation and moduli than that of the vulcanizate derived from example 5.

Although the invention has been described in detail in the foregong for the purpose of illustration, it is to be understood that such detail is solely for that purpose and that variations can be made therein by those skilled in the art without departing from the spirit and scope of the invention except as it may be limited by the claims.

What is claimed is:

1. A process for the removal of iron- and rhodium-containing catalyst residues from hydrogenated nitrile rubber which comprises the step of treating a solution of hydrogenated nitrile rubber containing such residues with a homodispersed, macroporous, cross-linked styrene-divinylbenzene copolymer resin having thiourea functional groups.

2. A process according to claim 1 wherein the hydrogenated nitrile rubber is dissolved in a halogenated solvent.

3. A process according to claim 2 wherein the solvent is monochlorobenzene.

4. A process according to claim 2 wherein solution contains from about 0.5 to about 20 weight percent of hydrogenated nitrile rubber.

5. A process according to claim 4 wherein solution contains from about 3 to about 12 weight percent of hydrogenated nitrile rubber.

6. A process according to claim 5 wherein the process is carried out at a temperature in the range of from about 60° C. to about 120° C.

7. A process according to claim 6 wherein the process is carried out at a temperature in the range of from about 90° C. to about 120° C.

8. A process according to claim 7 wherein the amount of resin used is in the range of from about 0.1 to about 10 weight percent, based upon the amount of hydrogenated nitrile rubber in the solution.

9. A process according to claim 8 wherein the amount of resin used is in the range of from about 0.5 to about 5 weight percent, based upon the amount of hydrogenated nitrile rubber in the solution.

10. A process according to claim 1 wherein the resin is packed into a column and the solution containing the hydrogenated nitrile rubber passed through the column in a continuous fashion.

11. A process according to claim 10 in which the solution containing the hydrogenated nitrile rubber is cycled through the column more than once.

* * * * *